(12) United States Patent
Akagi (10) Patent No.: US 11,290,669 B2
(45) Date of Patent: Mar. 29, 2022

(54) IMAGE READING APPARATUS AND IMAGE FORMING APPARATUS

(71) Applicant: CANON KABUSHIKI KAISHA, Tokyo (JP)

(72) Inventor: Daisuke Akagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 16/835,686

(22) Filed: Mar. 31, 2020

(65) Prior Publication Data

US 2020/0336689 A1 Oct. 22, 2020

(30) Foreign Application Priority Data

Apr. 19, 2019 (JP) .............................. JP2019-080009
Mar. 2, 2020 (JP) .............................. JP2020-034679

(51) Int. Cl.
| | |
|---|---|
| *H04N 1/08* | (2006.01) |
| *H04N 5/3745* | (2011.01) |
| *H04N 1/028* | (2006.01) |
| *H04N 1/00* | (2006.01) |

(52) U.S. Cl.
CPC ..... *H04N 5/37455* (2013.01); *H04N 1/00018* (2013.01); *H04N 1/028* (2013.01)

(58) Field of Classification Search
CPC ....................... H04N 5/37455; H04N 1/00018
See application file for complete search history.

(56) References Cited

U.S. PATENT DOCUMENTS

| | | | | |
|---|---|---|---|---|
| 2008/0122942 A1* | 5/2008 | Mimata | .................. | H04N 5/372 348/222.1 |
| 2008/0297616 A1* | 12/2008 | Nagase | ................ | H04N 5/3692 348/222.1 |
| 2015/0281493 A1 | 10/2015 | Sato | .............................. | 358/448 |
| 2017/0070636 A1 | 3/2017 | Sekiya | ............... | H04N 1/02815 |
| 2019/0273836 A1 | 9/2019 | Akagi | ................ | H04N 1/02885 |

FOREIGN PATENT DOCUMENTS

| | | |
|---|---|---|
| CN | 104954623 | 9/2015 |
| JP | 2010-074673 | 4/2010 |
| JP | 2011-176477 | 9/2011 |

OTHER PUBLICATIONS

Office Action dated Nov. 22, 2021 in counterpart Chinese Application No. 202010288046.3, together with English translation thereof.

* cited by examiner

*Primary Examiner* — Ibrahim Siddo
(74) *Attorney, Agent, or Firm* — Venable LLP (57) ABSTRACT

An image reading apparatus includes a light emitter configured to irradiate an original with light, a reading device including a line sensor and an amplifier, a detector configured to detect a temperature of the reading device, a sampling portion configured to sample a value of the analog signal output from the amplifier, a converter configured to convert the value sampled by the sampling portion into a digital value. The sampling portion is configured to sample the analog signal corresponding to a first light-receiving element included in the plurality of light-receiving elements at a first timing in a case where the temperature detected by the detector is a first temperature, and to sample the analog signal corresponding to the first light-receiving element at a second timing, which is later than the first timing.

16 Claims, 7 Drawing Sheets

IMAGE READING APPARATUS AND IMAGE FORMING APPARATUS

BACKGROUND OF THE INVENTION

Field of the Invention

The present disclosure relates to an image reading apparatus configured to read an image (hereinafter referred to as "original image") formed on an original, and an image forming apparatus including the image reading apparatus.

Description of the Related Art

An image reading apparatus reads an original image by irradiating an original with light emitted from a light source and reading reflected light with an image sensor. The original is placed on an original table glass of the image reading apparatus, with a surface of the original to be read facing down. When an image of the original placed on the original table glass is to be read, the image reading apparatus reads the original image by scanning the original while moving the light source along one direction below the original table glass. The image reading apparatus can also use an auto document feeder (ADF), which is configured to convey an original, to read an original image from the original that is being conveyed.

The image sensor included in the image reading apparatus includes a plurality of pixels arrayed in line in a width direction of the original. The width direction of the original is a main scanning direction during reading. Examples of the image sensor include a charge coupled device (CCD) image sensor and a complementary metal-oxide-semiconductor (CMOS) image sensor. The CMOS image sensor generally consumes a smaller amount of power than the CCD image sensor. Further, the CMOS image sensor allows random access to a pixel.

The CMOS image sensor is configured to convert electric charges accumulated in pixels by receiving light into a voltage for each pixel, and to output the voltage obtained as a result of the conversion as an analog signal (hereinafter referred to as "analog image signal") via an output amplifier. The analog image signal is subjected to predetermined processing, such as AD conversion, in an analog front end (AFE), for example, and is output from the image reading apparatus. The AFE is configured to sample the analog image signals at predetermined periods, to thereby convert the analog image signals into digital signals.

In a CMOS image sensor including a large number of pixels in the main scanning direction, the output amplifier is often arranged at an end of the CMOS image sensor in the main scanning direction. In this configuration, a distance from a first pixel of the CMOS image sensor to the output amplifier is different from a distance from a second pixel of the CMOS image sensor to the output amplifier. As a result, time required from when an analog image signal is output from the first pixel to when the analog image signal is output from the output amplifier (output time) becomes different from time from when an analog image signal is output from the second pixel to when the analog image signal is output from the output amplifier.

When the output time is varied for each pixel, the analog image signal may not be sampled under a state in which a signal level of the analog image signal is stable. Specifically, the analog image signal may be sampled at a timing at which the signal level of the analog image signal fluctuates. In Japanese Patent Application Laid-open No. 2010-74673, there is disclosed a technology for suppressing, by changing a sampling timing of the AFE depending on a position of a pixel of the CMOS image sensor, effects due to variation in output time caused by the position of the pixel.

The output time is varied not only by the position of the pixel but also by a temperature of the CMOS image sensor. A significant cause for this is a temperature characteristic of the output amplifier included in the CMOS image sensor. The temperature of the CMOS image sensor is changed by an operational status and an installation environment of the image reading apparatus. In other words, depending on a usage environment of the CMOS image sensor, the analog image signal may not be sampled under a state in which an output level of the analog image signal is stable. As a result, accuracy of reading an image of the original is reduced. The present disclosure has been made in view of the above-mentioned problem, and therefore has an object to prevent a situation in which accuracy of reading an image of an original is reduced.

SUMMARY OF THE INVENTION

An image reading apparatus of the present disclosure includes a light emitting unit configured to irradiate an original with light; a reading device including a line sensor and an amplifier, the line sensor including a plurality of light-receiving elements arranged in a predetermined direction to receive the light reflected by the original, the amplifier being configured to amplify an analog signal corresponding to results of receiving the light by the plurality of light-receiving elements included in the line sensor; a detector configured to detect a temperature of the reading device; a sampling unit configured to sample a value of the analog signal output from the amplifier, wherein the sampling unit is configured to sample the analog signal corresponding to a first light-receiving element included in the plurality of light-receiving elements at a first timing in a case where the temperature detected by the detector is a first temperature, and to sample the analog signal corresponding to the first light-receiving element at a second timing, which is later than the first timing, in a case where the temperature detected by the detector is a second temperature, which is higher than the first temperature; a converter configured to convert the value sampled by the sampling unit into a digital value; and a generator configured to generate image data representing an image of the original based on the digital value obtained by the conversion by the converter.

Further features of the present invention will become apparent from the following description of exemplary embodiments (with reference to the attached drawings).

DESCRIPTION OF THE EMBODIMENTS

Now, at least one embodiment of the present disclosure is described in detail with reference to the drawings.

<Image Reading Apparatus>

Figure 1:
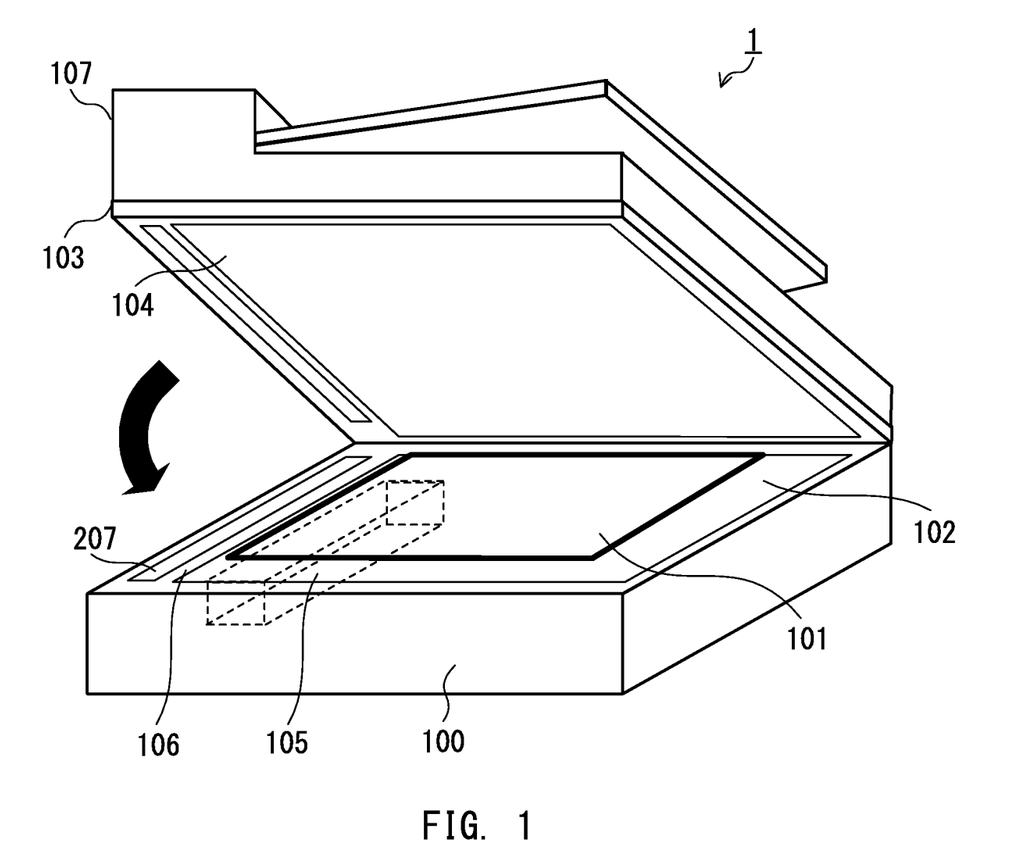
FIG. 1 is a view for illustrating a configuration of an image reading apparatus according to at least one embodiment of the present disclosure.
Figure 2:
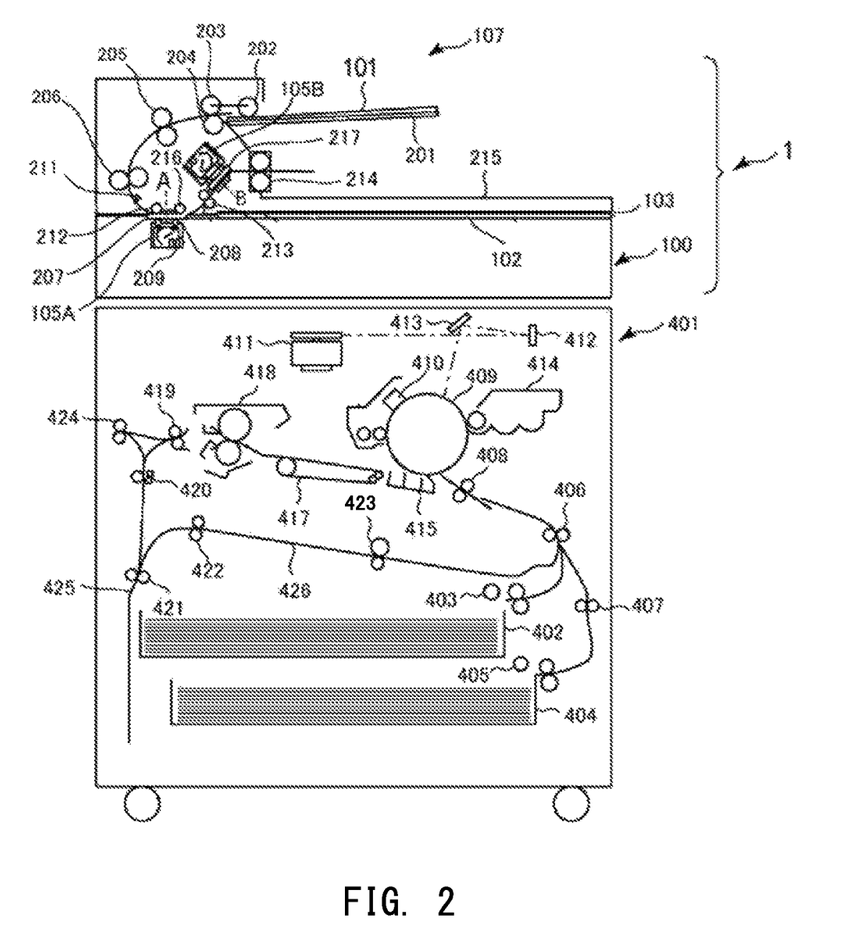
FIG. 2 is a view for illustrating an internal configuration of the image reading apparatus.

FIG. 1 is a view for illustrating a configuration of an image reading apparatus 1 according to at least one embodiment. Further, FIG. 2 is a view for illustrating an internal configuration of the image reading apparatus 1. The image reading apparatus 1 includes a reading device 100 and a cover 103. The cover 103 is mounted to the reading device 100 to be freely opened or closed (rotatable). In FIG. 1, the cover 103 is in a state of being opened with respect to the reading device 100. In FIG. 2, the cover 103 is in a state of being closed with respect to the reading device 100.

The reading device 100 includes an original table glass 102 on which an original 101, which is to be read, is to be placed. On a surface of the cover 103 on the original table glass 102 side, there is provided a white pressing plate 104. The pressing plate 104 is configured to press, toward the original table glass 102, the original 101, which is placed on the original table glass 102, when the cover 103 is in a state of being closed. The reading device 100 includes a flow-reading glass 207, which is provided on the same surface as the original table glass 102. In the reading device 100, at a position corresponding to a frame 106 provided between the original table glass 102 and the flow-reading glass 207, there is provided a white reference plate being a reference member to be used for shading correction.

In the reading device 100, at a position below the original table glass 102, there is provided a reader 105A configured to read an original image. The reader 105A is an optical sensor having a substantially rectangular-parallelepiped shape, and is configured to read an original image from the original 101 along a longitudinal direction of the reader 105A as a main scanning direction. When the original 101 placed on the original table glass 102 is to be read, the reader 105A reads the original 101 while being moved by a motor (not shown) in a sub-scanning direction orthogonal to the main scanning direction.

The cover 103 includes an original conveyor 107. The original conveyor 107 is configured to convey a plurality of originals to the flow-reading glass 207 in succession when the cover 103 is in the state of being closed. When the reader 105A reads an original conveyed to the flow-reading glass 207 by the original conveyor 107, the reader 105A reads the conveyed original at a position directly below the flow-reading glass 207.

The original conveyor 107 includes an original tray 201 on which the original 101 is to be placed, and a delivery tray 215 to which the original 101 is to be delivered after image reading. The original tray 201 is capable of receiving a plurality of originals 101 to be placed thereon. The original conveyor 107 includes a pickup roller 202, separation rollers 203 and 204, front conveyance rollers 205, lead rollers 206, pressing rollers 212 and 216, rear conveyance rollers 213, and delivery rollers 214.

The pickup roller 202 is configured to feed the originals 101 sequentially from the top of the originals placed on the original tray 201. In order to prevent the simultaneous feeding of a plurality of originals, the separation rollers 203 and 204 separate the originals one by one. For example, the separation roller 203 rotates in a direction of conveying the originals, and the separation roller 204 does not rotate, thereby separating the originals one by one.

The separation rollers 203 and 204 are configured to convey the separated original 101 to the front conveyance rollers 205. The front conveyance rollers 205 are a pair of rollers, and are configured to convey the original 101 to the lead rollers 206. The lead rollers 206 are a pair of rollers, and are configured to convey the original 101 to a reading position A, at which the original 101 is to be read by the reader 105A. The reading position A is located above the flow-reading glass 207 when the cover 103 is in the state of being closed. The reader 105A reads an image on a first surface of the original 101, which is conveyed through the reading position A, through intermediation of the flow-reading glass 207. On an upstream side of the reading position A in the conveyance direction of the original 101, there is provided an original-leading-edge detection sensor 211 configured to detect a leading edge of the original 101 in the conveyance direction. The reader 105A starts reading the original image after elapse of a predetermined time period from the timing at which the original-leading-edge detection sensor 211 detects the leading edge of the original 101.

The reading position A is provided between the pressing roller 212 and the pressing roller 216. The pressing rollers 212 and 216 are configured to press the original 101 toward the flow-reading glass 207 so that the original 101 does not float from the flow-reading glass 207.

The rear conveyance rollers 213 are a pair of rollers, and are configured to convey the original 101, which has passed through the reading position A, to a reading position B. The original conveyor 107 includes a reader 105B. The reader 105B is configured to read an image on a second surface of the original 101, which is conveyed through the reading position B, through intermediation of a flow-reading glass 217. The reader 105B starts reading the original image after elapse of a predetermined time period from a timing at which the original-leading-edge detection sensor 211 detects the leading edge of the original 101.

The delivery rollers 214 are a pair of rollers, and are configured to deliver the original 101 to the delivery tray 215. The delivery tray 215 receives the original 101 after reading.

The reader 105A provided inside the reading device 100 includes a light emitter 208 serving as a light source, an image sensor (in at least one embodiment, CMOS image sensor) 209, and an optical component group. The light emitter 208 includes light emitting elements, for example, light emitting diodes (LEDs), and is configured to irradiate the original 101 with line-shaped light along the main scanning direction. The light radiated onto the original 101 is reflected, and then is guided to the CMOS image sensor 209 by the optical component group. The CMOS image sensor 209 is a line sensor in which a plurality of pixels are arrayed in line in the main scanning direction. Reflected light from the original 101, which has been guided by the optical component group, is received by the pixels. The CMOS image sensor 209 outputs an electric signal (analog image signal) being an analog signal corresponding to the reflected light that has been received by each pixel. The analog image signal represents, for example, a brightness value at each position in the main scanning direction. Analog image signals of all of the pixels represent brightness values for one line of the original image in the main scanning direction.

The reader 105A generates image data being digital signals representing one line of the original image based on the analog image signals. The reader 105A stands by at a home position when the reading processing is not performed. The home position is set, for example, at a position directly below the flow-reading glass 207 (reading position A). A configuration and reading processing of the reader 105B are similar to those of the reader 105A, and hence a description thereof is omitted.

As described above, the white reference plate is provided inside the reading device 100 between the flow-reading glass 207 and the original table glass 102. The white reference plate is a reference member which is to be used at the time of acquiring shading data for shading correction.

<Image Printing Apparatus>

In at least one embodiment, an image printing apparatus 401 configured to form an image on a recording medium based on the image read by the image reading apparatus 1 is provided below the image reading apparatus 1. The image printing apparatus 401 used in at least one embodiment is a monochrome electrophotographic copying machine. However, the image printing apparatus is not limited to a copying machine, and may be, for example, a facsimile machine, a printing machine, or a printer. Further, a recording system is not limited to the electrophotographic system, and may be, for example, an inkjet system. Still further, the form of the image printing apparatus may be a monochrome form or a color form.

Inside the image printing apparatus 401, sheet receiving trays 402 and 404 are provided. In the sheet receiving trays 402 and 404, recording media of different types may be received, respectively. For example, A4-size plain paper is received in the sheet receiving tray 402, and A4-size boards are received in the sheet receiving tray 404. A recording medium is a material on which an image is to be formed by an image forming apparatus, and examples of the recording medium include paper, a resin sheet, a fabric, an OHP sheet, and a label.

A recording medium received in the sheet receiving tray 402 is fed by a pickup roller 403, and is fed to registration rollers 408 by conveyance rollers 406. Similarly, a recording medium received in the sheet receiving tray 404 is fed by a pickup roller 405, and is fed to the registration rollers 408 by conveyance rollers 407 and 406.

The image data output from the image reading apparatus 1 is input to a light scanning device 411 including a semiconductor laser and a polygon mirror. Further, a photosensitive drum 409 has an outer peripheral surface thereof charged by a charging device 410. After the outer peripheral surface of the photosensitive drum 409 is charged, the outer peripheral surface of the photosensitive drum 409 is irradiated with a laser beam corresponding to the image data, which has been input from the image reading apparatus 1 to the light scanning device 411, from the polygon mirror of the light scanning device 411 via mirrors 412 and 413. As a result, an electrostatic latent image is formed on the outer peripheral surface of the photosensitive drum 409.

Subsequently, the electrostatic latent image is developed with a toner contained in a developing device 414 to form a toner image on the outer peripheral surface of the photosensitive drum 409. The toner image formed on the photosensitive drum 409 is transferred onto the recording medium by a transfer charging device 415, which is provided at a position (transfer position) opposed to the photosensitive drum 409. The registration rollers 408 feed the recording medium to the transfer position in synchronization with a transfer timing at which an image is transferred onto the recording medium by the transfer charging device 415.

As described above, the recording medium having the toner image transferred thereon is fed to a fixing device 418 by a conveyance belt 417, and is heated and pressed by the fixing device 418 so that the toner image is fixed on the recording medium. As a result, the image is formed on the recording medium by the image printing apparatus 401.

In a case where an image is formed under a single-sided printing mode, the recording medium that has passed through the fixing device 418 is delivered to a delivery tray (not shown) by delivery rollers 419 and 424. Further, in a case where images are formed under a duplex printing mode, after fixing processing is performed on a first surface of the recording medium by the fixing device 418, the recording medium is conveyed to a reverse path 425 by the delivery rollers 419, conveyance rollers 420, and reverse rollers 421. Then, the recording medium is conveyed again to the registration rollers 408 by conveyance rollers 422 and 423, and an image is formed on a second surface of the recording medium by the above-mentioned method. Thereafter, the recording medium is delivered to the delivery tray (not shown) by the delivery rollers 419 and 424.

Further, in a case where a recording medium having an image formed on the first surface thereof is delivered face-down to the outside of the image printing apparatus 401, the recording medium that has passed through the fixing device 418 is conveyed while passing through the delivery rollers 419 in a direction toward the conveyance rollers 420. Then, rotation of the conveyance rollers 420 is reversed just before the trailing edge of the recording medium passes through a nip portion of the conveyance rollers 420 so that the recording medium is delivered to the outside of the image printing apparatus 401 via the delivery rollers 424 in a state in which the first surface of the recording medium faces down.

The configuration and functions of the image printing apparatus 401 have been described above.

<Reader>

Figure 3:
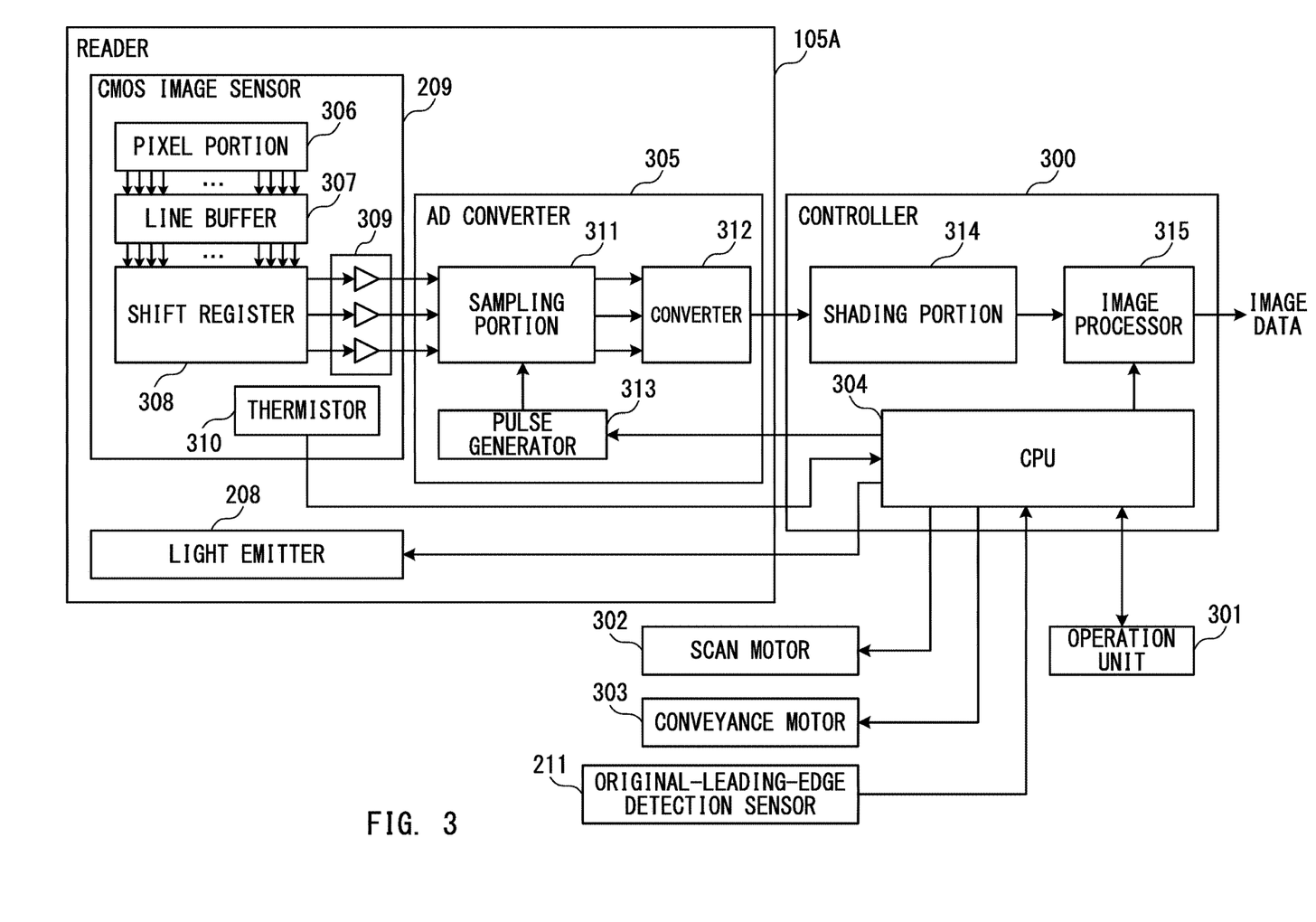
FIG. 3 is an explanatory diagram of a controller.

FIG. 3 is an explanatory diagram of a controller 300 configured to control operation of the image reading apparatus 1. To the controller 300, the reader 105A, a scan motor 302 configured to move the reader 105A in a sub-scanning direction, a conveyance motor 303 configured to drive various rollers included in the original conveyor 107, the original-leading-edge detection sensor 211, and an operation unit 301 are connected.

The operation unit 301 is a user interface in which an input device and an output device are combined. The input device includes, for example, input keys, numeric keys, and a touch panel, and is configured to input, for example, an instruction to the controller 300 through an operation by a user. The output device includes, for example, a display and a loudspeaker, and is configured to display an image and output a sound in response to an instruction from the controller 300.

To the controller 300, controllers (not shown) configured to control the reader 105B and the image printing apparatus 401 are also connected.

The controller 300 includes a central processing unit (CPU) 304, a shading portion 314, and an image processor 315.

The CPU 304 is configured to control an operation of the image reading apparatus 1 by executing a predetermined computer program. When an image reading instruction is input from the operation unit 301, the CPU 304 starts control on image reading processing by the image reading apparatus 1.

The shading portion 314 corrects, for example, light-amount unevenness of the light emitter 208 and variation in sensitivity of the pixels of the CMOS image sensor 209 based on image data obtained by the reader 105A reading the white reference plate.

The image processor 315 performs image processing, such as noise removal, on the image data having been subjected to the shading processing by the shading portion 314, and outputs the processed image data to, for example, an external device, such as the controller of the image printing apparatus 401.

The reader 105A includes, as an AFE, an AD converter 305 configured to convert the analog image signal into the image data, in addition to the light emitter 208 and the CMOS image sensor 209. The configuration of the reader 105A is described in detail.

The CMOS image sensor 209 includes a pixel portion 306 formed of a plurality of pixels, a line buffer 307, a shift register 308, an output amplifier 309, and a thermistor 310.

The pixel portion 306 is capable of detecting light of three colors: red (R), green (G), and blue (B), and of reading a color image recorded on the original 101. In the CMOS image sensor 209 in at least one embodiment, for example, 7,500 pixels are prepared for each of R, G, and B. Each pixel is formed of a photoelectric conversion element configured to convert light into electric charges, and accumulates electric charges corresponding to an intensity of received light.

To each pixel, the line buffer 307 is connected. The line buffer 307 is configured to convert the electric charges accumulated in each pixel into a voltage, and to store the voltage.

To the line buffer 307, the shift register 308 is connected. The shift register 308 is configured to sequentially read voltages of pixels stored in the line buffer 307 in order for every three pixels, and to transmit the read voltages to the output amplifier 309.

The output amplifier 309 is configured to transmit the voltages, which have been transmitted from the shift register 308, as the analog image signal to the AD converter 305 at predetermined periods.

The thermistor 310 is provided to detect a temperature of the CMOS image sensor 209, and is mounted in the vicinity of the output amplifier 309 on the same substrate as the CMOS image sensor 209. The phrase "on the same substrate" as used herein includes, for example, a state in which the thermistor 310 is provided on the same surface as a surface on which the pixel portion 306, the line buffer 307, the shift register 308, the output amplifier 309, and other components are provided. The phrase "on the same substrate" also includes, for example, a state in which, in a configuration in which a layer in which the pixel portion 306 is provided, a layer in which the line buffer 307 is provided, a layer in which the shift register 308 is provided, and a layer in which the output amplifier 309 is provided are laminated on a silicon substrate, the thermistor 310 is provided in a layer different from those layers, and above the same silicon substrate as those layers.

Figure 4:
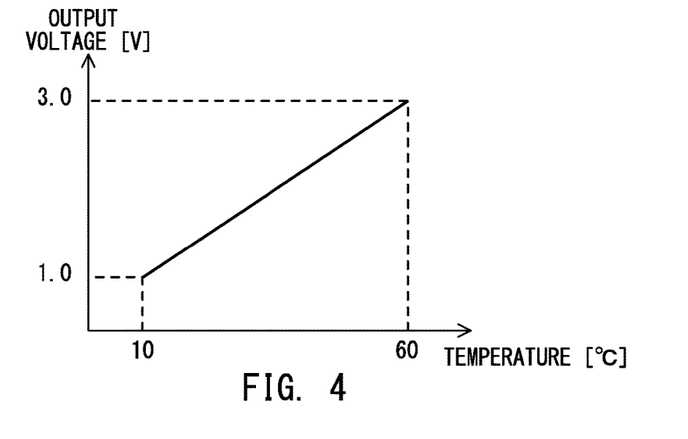
FIG. 4 is a graph for showing a characteristic of a thermistor.

The thermistor 310 is configured to transmit, to the CPU 304, an output voltage corresponding to the detected temperature. Although details of the temperature detection are described later, the thermistor 310 is used for detecting a temperature of the output amplifier 309. FIG. 4 is a graph for showing a characteristic of the thermistor 310, and shows a relationship between the detected temperature and the output voltage. The output voltage has a linear relationship with respect to the temperature, and as the temperature becomes higher, a voltage value of the output voltage to be output becomes higher. This characteristic is merely an example.

The AD converter 305 includes a sampling portion 311, a converter 312, and a pulse generator 313.

The analog image signal output from the output amplifier 309 is input to the sampling portion 311.

The pulse generator 313 is configured to transmit a timing signal, which is a pulse signal for controlling a sampling timing of the sampling portion 311, to the sampling portion 311. The timing signal has predetermined periods. In at least one embodiment, the periods of the timing signal are, for example, substantially the same periods as the periods at which the output amplifier 309 transmits the analog image signal to the AD converter 305. In at least one embodiment, the phrase "substantially the same periods" means that a difference between the periods of the timing signal and the periods at which the output amplifier 309 transmits the analog image signal to the AD converter 305 is a period within a range of ±10% of the period of the timing signal.

The sampling portion 311 is configured to sample the analog image signal in accordance with the timing signal, and to transmit the sampled analog image signal to the converter 312.

The converter 312 is configured to AD convert the analog image signal sampled by the sampling portion 311 into image data, which is digital data.

Figure 5:
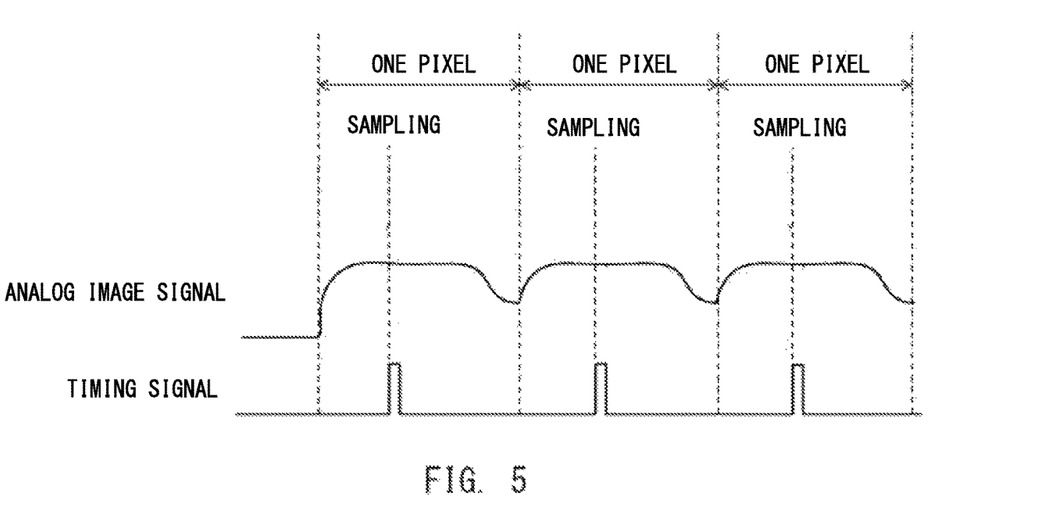
FIG. 5 is an explanatory chart of a sampling timing.

FIG. 5 is an explanatory chart of a sampling timing of the analog image signal. In at least one embodiment, the analog image signal is sampled at timings at which the timing signal is shifted to a high level. In at least one embodiment, a timing at which the timing signal is shifted to the high level for the first time after the CMOS image sensor 209 is driven (hereinafter referred to as "start timing") is set as follows. Specifically, the start timing is set in advance to a timing at which a predetermined time period has elapsed after the CMOS image sensor 209 is driven. The predetermined time period is a time period that is determined in advance by an experiment, and is set in advance to a time period required, under a state in which the output of the thermistor 310 represents 25° C., for the analog image signal output from the output amplifier 309 to be stabilized for the first time after the CMOS image sensor 209 is driven.

Figure 6:
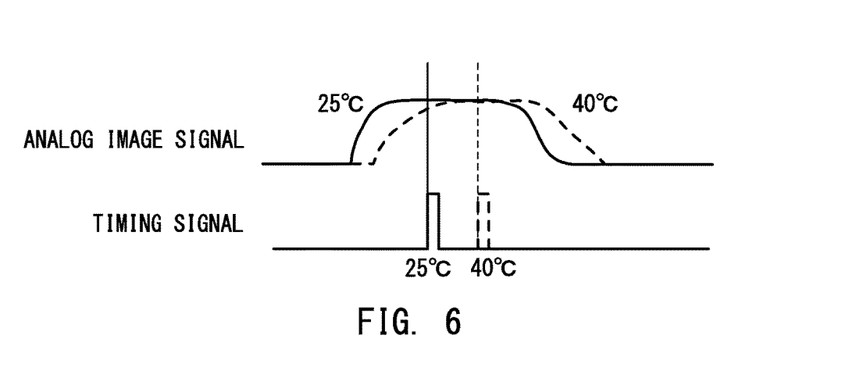
FIG. 6 is a chart for illustrating correlation between an analog image signal and a sample-and-hold timing signal.

FIG. 6 is a chart for illustrating correlation between the analog image signal and the timing signal. The output amplifier 309 has a characteristic that, as the temperature increases, a timing at which the analog image signal is output is delayed.

For example, under the state in which the temperature of the output amplifier 309 is 25° C., when the analog image signal is sampled at the predetermined periods from the start timing that has been set in advance, the analog image signal is sampled under the state in which the analog image signal is stable.

In contrast, for example, under a state in which the temperature of the output amplifier 309 is 40° C., when the analog image signal is sampled at the predetermined periods from the start timing that has been set in advance, the analog image signal is sampled under a state in which the analog image signal is unstable. As a result, accuracy of reading an image of the original is reduced.

To address this problem, in at least one embodiment, the following configuration is applied to suppress the reduction in accuracy of reading the image of the original.

Figure 7:
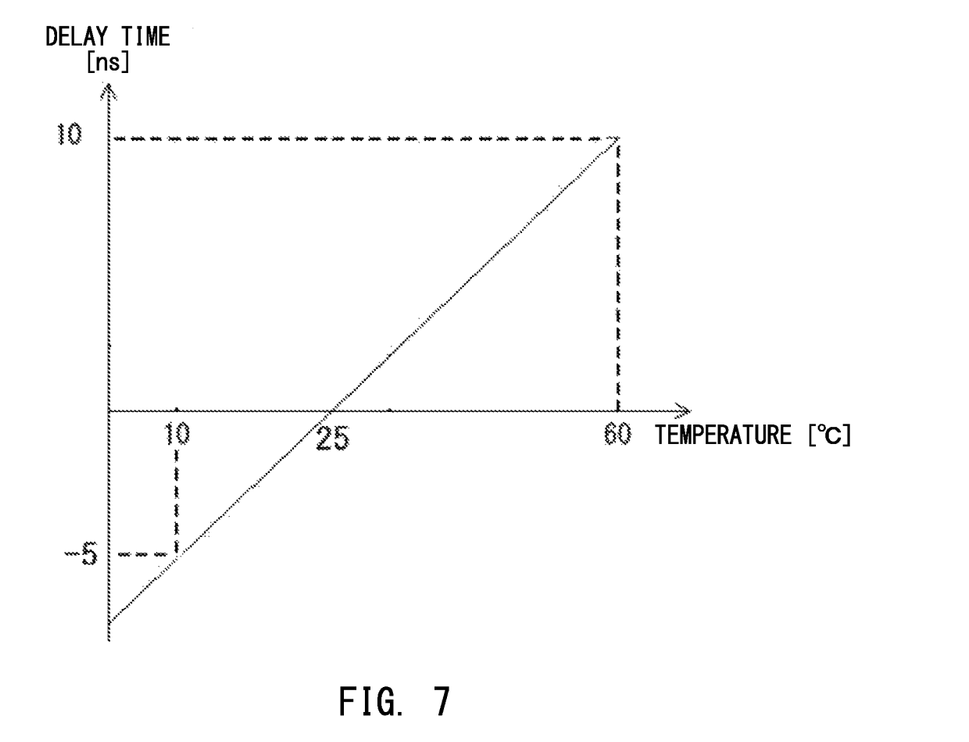
FIG. 7 is a graph for showing correlation between a delay time period of the analog image signal and a temperature of an output amplifier.

FIG. 7 is a graph for showing correlation between a delay time period of the analog image signal and the temperature of the output amplifier 309. FIG. 7 shows a characteristic that, as the temperature of the output amplifier 309 is increased, the delay time period of the analog image signal is increased. Specifically, FIG. 7 shows a characteristic that an output delay time period takes a positive value in a case where the temperature detected by the thermistor 310 is higher than 25° C., and the output delay time period takes a negative value in a case where the temperature is lower than 25° C.

In the CPU 304, a relationship between the temperature of the output amplifier 309 and the delay time period of the analog image signal is programmed (stored) in advance. The CPU 304 outputs the delay time period corresponding to the output voltage of the thermistor 310 to the pulse generator 313.

The pulse generator 313 adjusts the sampling timing by the delay time period. In other words, the pulse generator 313 generates the timing signal so that the sampling timing is delayed in a case where the delay time period has a positive value. In contrast, the pulse generator 313 generates the timing signal so that the sampling timing is advanced in a case where the delay time period has a negative value. As a result, even when the timing at which the analog image signal is output varies due to a variation in temperature of the output amplifier 309, the sampling timing can be set appropriately. In other words, the sampling is performed at a timing at which the voltage of the analog image signal is stable. As a result, the reduction in accuracy of reading the original image can be suppressed. The pulse generator 313 adjusts a timing at which the timing signal becomes the high level when adjusting the sampling timing. In other words, the period of the timing signal is not changed.

Figure 8:
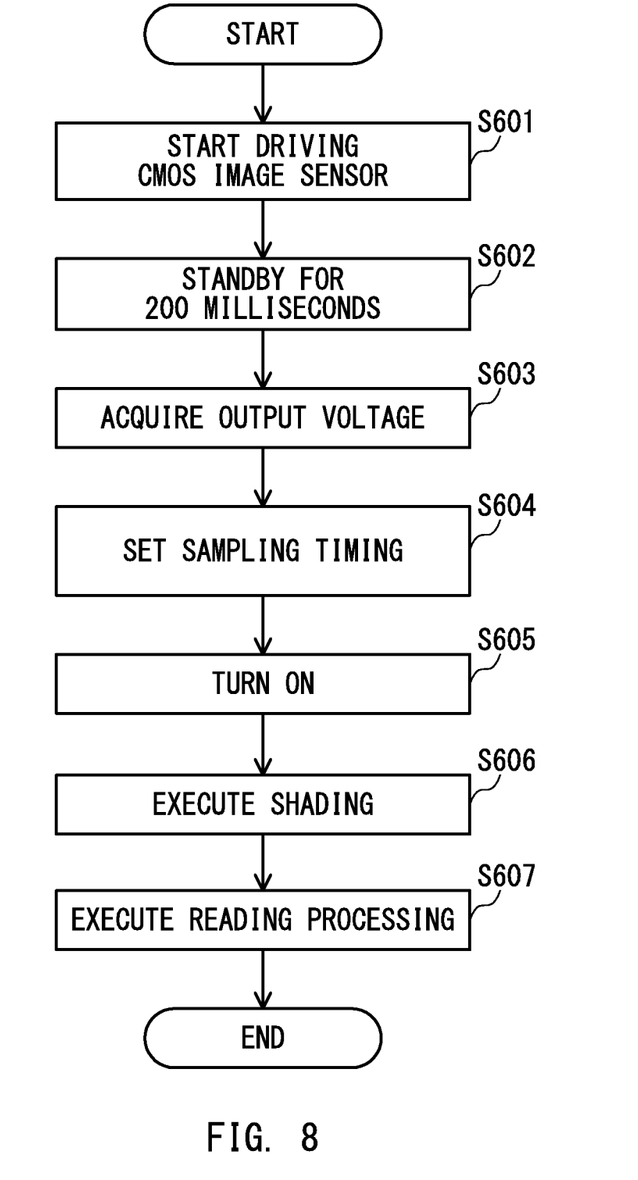
FIG. 8 is a flow chart for illustrating image reading processing.

FIG. 8 is a flow chart for illustrating the image reading processing performed by the image reading apparatus 1 having the above-mentioned configuration. Processing of the flow chart is executed by the CPU 304 when the image reading instruction is input from the operation unit 301 to the CPU 304.

When receiving the image reading instruction, the CPU 304 starts driving the CMOS image sensor 209 (Step S601). When starting to be driven under the control of the CPU 304, the CMOS image sensor 209 starts inputting the analog image signal from the output amplifier 309 to the AD converter 305. As a result, the temperature of the output amplifier 309 starts increasing.

Next, the CPU 304 stands by for the predetermined time period, which is 200 milliseconds in at least one embodiment, under this state (Step S602). This standby time is set to a time period that is sufficient for the temperature of the output amplifier 309 to be stabilized.

When the standby time has elapsed, the CPU 304 acquires the output voltage output from the thermistor 310 (Step S603). The CPU 304 converts the acquired output voltage into the digital signal.

Then, the CPU 304 outputs, to the pulse generator 313, the delay time period corresponding to the output voltage of the thermistor 310 (Step S604). As a result, the sampling timing corresponding to the temperature represented by the output voltage of the thermistor 310 is set.

After setting the sampling timing, the CPU 304 turns on the light emitter 208 (Step S605).

Next, the CPU 304 causes the shading portion 314 to perform shading correction (Step S606). To that end, the CPU 304 moves the reader 105A to the position directly below the white reference plate by the scan motor 302, and causes the reader 105A to read the white reference plate. The reader 105A transmits, to the shading portion 314, the image data generated by reading the white reference plate. The shading portion 314 performs the shading correction based on the image data generated from a result of reading the white reference plate.

When the shading correction is completed, the CPU 304 executes the reading processing on the original 101 (Step S607). This completes the image reading processing.

As described above, the CPU 304 in at least one embodiment detects the temperature of the output amplifier 309 provided inside the CMOS image sensor 209, and determines the delay time period of the analog image signal based on the detection result. The pulse generator 313 adjusts the sampling timing depending on the determined delay time period. As a result, even when the timing at which the analog image signal is output varies due to the variation in temperature of the output amplifier 309, the sampling timing can be set appropriately. In other words, the sampling is performed at the timing at which the voltage of the analog image signal is stable. As a result, the reduction in accuracy of reading the original image can be suppressed.

Figure 9:
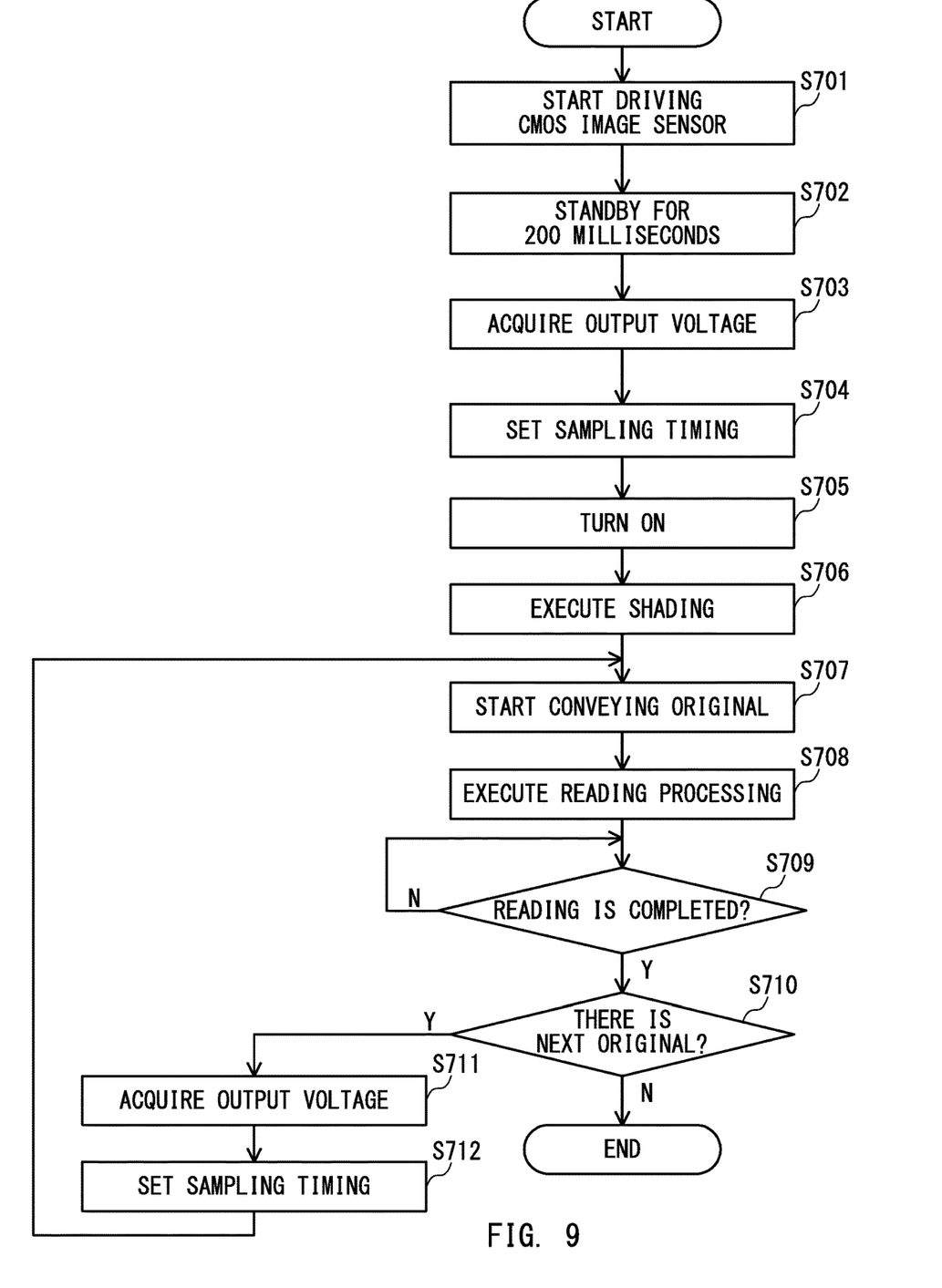
FIG. 9 is a flow chart for illustrating image reading processing performed when a plurality of originals are read in succession.

The image reading processing illustrated in FIG. 8 is processing performed when one original 101 is read. When a plurality of originals 101 are read in succession, it is required to adjust the sampling timing among the originals. This is because, when the image reading processing is performed in succession, the temperature of the output amplifier 309 of the CMOS image sensor 209 is increased. FIG. 9 is a flow chart for illustrating image reading processing performed when the plurality of originals 101 are read in succession. Processing of this flow chart is executed by the CPU 304 when the image reading instruction is input from the operation unit 301 to the CPU 304.

Processing (Step S701 to Step S706) from the start of driving of the CMOS image sensor 209 to when the shading correction is performed is similar to processing of from Step S601 to Step S606 of FIG. 6, and hence a description thereof is omitted.

When the shading correction is completed, the CPU 304 drives the conveyance motor 303 to start conveying an original by the original conveyor 107 (Step S707).

Next, when the original-leading-edge detection sensor 211 detects the original 101 after the original 101 starts being conveyed, the CPU 304 causes the readers 105A and 105B to read the original images from the original 101 (Step S708).

Then, the CPU 304 determines whether the reading of one original 101 is completed based on the image data acquired from the readers 105A and 105B (Step S709).

When it is determined that the reading of the one original 101 has been completed (Step S709: Y), the CPU 304 determines whether the next original is placed on the original tray 201 (Step S710). To the original tray 201, a sensor configured to detect the presence or absence of an original placed on the original tray 201 is provided. The CPU 304 can determine the presence or absence of an original on the original tray 201 based on a result of the detection by the sensor. When there is no next original (Step S710: N), the CPU 304 ends the image reading processing.

When there is the next original (Step S710: Y), the CPU 304 acquires an output voltage corresponding to the detected temperature from the thermistor 310 (Step S711). The CPU 304 converts the acquired output voltage into a digital signal.

The CPU 304 outputs, to the pulse generator 313, a delay time period corresponding to the output voltage of the thermistor 310 (Step S712). As a result, a sampling timing corresponding to the temperature represented by the output voltage of the thermistor 310 is set.

Thereafter, the CPU 304 repeats the processing of Step S707 and the subsequent steps until there is no more original on the original tray 201. This completes the image reading processing.

As described above, the CPU 304 controls the sampling timing sequentially between an original and an original that are conveyed in succession. As a result, even when the temperature detected by the thermistor 310 varies while a plurality of originals 101 are read in succession, the sampling timing can be set appropriately. In other words, the sampling is performed at the timing at which the voltage of the analog image signal is stable. As a result, the reduction in accuracy of reading the original image can be suppressed.

The image reading apparatus 1 according to at least one embodiment described above can perform the sampling at the timing at which an output level of the analog image signal is stable by setting the sampling timing depending on the temperature of the CMOS image sensor 209. As a result, the image reading apparatus 1 can AD convert the analog image signal accurately to generate the image data. In other words, the reduction in accuracy of reading the original image can be suppressed.

In at least one embodiment, the CPU 304 controls the sampling timing sequentially between an original and an original that are conveyed in succession, but the present disclosure is not limited thereto. For example, the CPU 304 may control the sampling timing each time a predetermined number of (for example, 10) originals are conveyed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-080009, filed Apr. 19, 2019 and No. 2020-034679, filed Mar. 2, 2020, which are hereby incorporated by reference herein in their entirety.

What is claimed is:

1. An image reading apparatus, comprising:
a light emitting unit configured to irradiate an original with light;
a reading device including a line sensor and an amplifier, the line sensor including a plurality of light-receiving elements arranged in a predetermined direction to receive the light reflected by the original, the amplifier being configured to amplify an analog signal corresponding to results of receiving the light by the plurality of light-receiving elements included in the line sensor;
a detector configured to detect a temperature of the reading device;
a sampling unit configured to sample a value of the analog signal output from the amplifier, wherein the sampling unit is configured to sample the analog signal corresponding to a first light-receiving element included in the plurality of light-receiving elements at a first timing in a case where the temperature detected by the detector is a first temperature, and to sample the analog signal corresponding to the first light-receiving element at a second timing, which is later than the first timing, in a case where the temperature detected by the detector is a second temperature, which is higher than the first temperature;
a converter configured to convert the value sampled by the sampling unit into a digital value; and
a generator configured to generate image data representing an image of the original based on the digital value obtained by the conversion by the converter.

2. The image reading apparatus according to claim 1,
wherein the amplifier is configured to output the analog signal at first periods,
wherein the sampling unit is configured to change, before starting to sample values of an analog signal corresponding to an image corresponding to one page of the original, a timing to sample the value of the analog signal, and
wherein the sampling unit is configured to sample the values of the analog signal at second periods during a period in which the values of the analog signal corresponding to the image corresponding to the one page of the original are sampled.

3. The image reading apparatus according to claim 2, wherein the first periods are the same as the second periods.

4. The image reading apparatus according to claim 2, wherein the first periods are substantially the same as the second periods.

5. The image reading apparatus according to claim 1, further comprising an original conveyor configured to convey an original,
wherein the reading device is configured to read an image of the original that is being conveyed by the original conveyor, and
wherein the sampling unit is configured to change, each time a predetermined number of originals are conveyed by the original conveyor, a timing to sample a value of the analog signal based on the temperature detected by the detector.

6. The image reading apparatus according to claim 5, wherein the sampling unit is configured to change, each time one original is conveyed by the original conveyor, a timing to sample a value of the analog signal based on the temperature detected by the detector.

7. The image reading apparatus according to claim 5,
wherein the amplifier is configured to output the analog signal at first periods,
wherein the sampling unit is configured to change, before starting to sample values of an analog signal corresponding to an image corresponding to one page of the original, a timing to sample the value of the analog signal, and
wherein the sampling unit is configured to sample the values of the analog signal at second periods during a period in which the values of the analog signal corresponding to the image corresponding to the one page of the original are sampled.

8. The image reading apparatus according to claim 7, wherein the first periods are the same as the second periods.

9. The image reading apparatus according to claim 7, wherein the first periods are substantially the same as the second periods.

10. The image reading apparatus according to claim 1, wherein the detector is mounted on the same substrate as the reading device.

11. The image reading apparatus according to claim 1, wherein the detector is a detector configured to detect a temperature of the amplifier.

12. The image reading apparatus according to claim 1, wherein periods at which the amplifier outputs the analog signal are the same as periods at which the sampling unit samples the analog signal.

13. The image reading apparatus according to claim 1, wherein periods at which the amplifier outputs the analog signal are substantially the same as periods at which the sampling unit samples the analog signal.

14. The image reading apparatus according to claim 1, wherein the line sensor is a CMOS image sensor.

15. The image reading apparatus according to claim 1, wherein the sampling unit is configured to change a timing to sample a value of the analog signal so as to sample the analog signal during a period in which the analog signal is stable.

16. An image forming apparatus, comprising:
- a light emitting unit configured to irradiate an original with light;
- a reading device including a line sensor and an amplifier, the line sensor including a plurality of light-receiving elements arranged in a predetermined direction to receive the light reflected by the original, the amplifier being configured to amplify an analog signal corresponding to results of receiving the light by the plurality of light-receiving elements included in the line sensor;
- a detector configured to detect a temperature of the reading device;
- a sampling unit configured to sample a value of the analog signal output from the amplifier, wherein the sampling unit is configured to sample the analog signal corresponding to a first light-receiving element included in the plurality of light-receiving elements at a first timing in a case where the temperature detected by the detector is a first temperature, and to sample the analog signal corresponding to the first light-receiving element at a second timing, which is later than the first timing, in a case where the temperature detected by the detector is a second temperature, which is higher than the first temperature;
- a converter configured to convert the value sampled by the sampling unit into a digital value;
- a generator configured to generate image data representing an image of the original based on the digital value obtained by the conversion by the converter; and
- an image forming unit configured to form the image on a recording medium based on the image data generated by the generator.

* * * * *